(12) United States Patent
Leonard

(10) Patent No.: US 8,959,530 B1
(45) Date of Patent: Feb. 17, 2015

(54) MESSAGING MIDDLEWARE PROCESSING THREAD COUNT BASED EVENTS

(71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 13/889,346

(22) Filed: May 7, 2013

(51) Int. Cl.
*G06F 9/46* (2006.01)
*G06F 9/54* (2006.01)

(52) U.S. Cl.
CPC .................................... *G06F 9/546* (2013.01)
USPC .......................... 719/314; 718/102; 718/104

(58) Field of Classification Search
None
See application file for complete search history.

(56) References Cited

U.S. PATENT DOCUMENTS

| | | | |
|---|---|---|---|
| 6,434,605 B1* | 8/2002 | Faulkner et al. | 709/213 |
| 7,950,017 B1* | 5/2011 | Cain et al. | 719/310 |
| 8,381,230 B2* | 2/2013 | Dozsa et al. | 719/314 |
| 8,424,019 B1* | 4/2013 | Leonard | 719/314 |
| 2001/0047495 A1* | 11/2001 | Kettley et al. | 714/2 |
| 2003/0028821 A1* | 2/2003 | Jin et al. | 714/15 |
| 2005/0060374 A1* | 3/2005 | Phillips | 709/206 |
| 2005/0114867 A1* | 5/2005 | Xu et al. | 719/318 |
| 2005/0129045 A1* | 6/2005 | Machulsky et al. | 370/428 |
| 2006/0109857 A1* | 5/2006 | Herrmann | 370/412 |
| 2006/0248536 A1* | 11/2006 | Eckert | 719/314 |
| 2013/0067438 A1* | 3/2013 | Bates | 717/124 |

OTHER PUBLICATIONS

"An Introduction to MQSeries Messaging and Queuing", New York University, Fall 2000, retrieved dated Sep. 9, 2014, cs.nyu.edu/courses/fall00/G22.2631 . . . /conron.doc, 2013.
"Handling Poison Messages", Microsoft, retrieved dated Sep. 15, 2014, http://msdn.microsoft.com/en-us/library/ms703179(d=printer,v=vs.85).aspx.
"Message Queue Interface", Tiger Logic, retrieved date Sep. 15, 2014, http://www.tigerlogic.com/pick/support/documentation/d3mqseries/21/userguide/message_queue_int.htm.
"Queue (abstract data type)", Wikipedia, retrieved date Sep. 15, 2014, http://en.wikipedia.org/wiki/Queue_(abstract_data_type).
"Middleware", Wikipedia, retrieved date Sep. 15, 2014, http://en.wikipedia.org/wiki/Middleware.

(Continued)

*Primary Examiner* — Charles E Anya

(57) ABSTRACT

A message queuing system implemented by at least one computer. The system comprises a performance queue to keep event status related to performance of non-performance queues, threads, which are sequences of programmed instructions, launched by the queue managers to transmit and receive messages over connections between individual queues, and an external monitoring application or a monitoring application within a queue manager. The monitoring application monitors threads, channels, and events in the message queuing system, polls the performance queue periodically and counts the number of threads in the case of the external monitoring application, directly gathers current event information in the case of the monitoring application within the queue manager, determines whether both the thread/threads and channel have failed when all threads of an application are missing, and restarts channels that failed after determining that both channels and all threads have failed.

20 Claims, 4 Drawing Sheets

(56) References Cited

OTHER PUBLICATIONS

Hohpe, Gregor, et al., "Enterprise Integration Patterns—Messaging Systems", Chapter 3, pp. 58, 59, 61, and 96, published Oct. 20, 2003, retrieved date Sep. 15, 2014, http://www.eaipatterns.com/.

"Talarian: Everything You Need to Know About Middleware", Talarian, 2000, retrieved date Sep. 15, 2014, cdn.ttgtmedia.com/searchWebServices/downloads/Talarian.pdf.

IBM Corp, "Integrating with TCP/IP using WebSphere Message Broker", Apr. 27, 2011, retrieved date Sep. 15, 2014, http://www.ibm.com/developerworks/websphere/library/techarticles/1105_ghosh/1105_ghosh.html.

"Introduction to Message Queuing" and Resources, IBM Corp., updated Aug. 13, 2014, retrieved date Sep. 26, 2014, http://www-01.ibm.com/support/knowledgecenter/SSFKSJ_7.5.0/com.ibm.mq.pro.doc/q002620_.htm.

"Threading and Uses of Threading", IBM Corp., updated Aug. 23, 2014, retrieved date Sep. 26, 2014, http://www-01.ibm.com/support/knowledgecenter/SSFKSJ_7.0.1/com.ibm.mq.amqtan.doc/wc10330_.htm?lang=en.

"Monitoring WebSphere MQ" and Resources, IBM Corp., updated Aug. 23, 2014, retrieved date Sep. 26, 2014, http://www-01.ibm.com/support/knowledgecenter/SSFKSJ_7.0.1/com.ibm.mq.csqzax.doc,/mo10120_.htm?lang=en.

\* cited by examiner

MESSAGING MIDDLEWARE PROCESSING THREAD COUNT BASED EVENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large business enterprises typically benefit from reliable and secure communications both within the enterprise and with clients, partners and suppliers around the globe via the Internet. Middleware helps enterprises achieve this goal by integrating applications on different platforms or with diverse technologies. Asynchronous communication with a message queuing mechanism may ensure reliable communications among different parties. Message queues typically receive, store, and forward messages and requests for information and services. Message queuing is a method of process-to-process or application-to-application communication, such as communication between an application that services a user and an application that retrieves data from a database. Message queuing middleware implements various components to realize message queuing services. Applications may communicate by writing and reading application-specific data, or messages, to and from queues, without having a dedicated synchronous link between the applications. The asynchronous feature of the message queuing middleware allows the application to continue processing after making a middleware service request.

SUMMARY

In an embodiment, a message queuing system implemented by at least one computer is disclosed. The message queuing system comprises two thread counters, at least two queues to which messages can be sent, a performance queue to keep event status related to performance of non-performance queues, at least two queue managers, and threads, which are sequences of programmed instructions, launched by the queue managers to transmit and receive messages over connections between individual queues. The message queuing system further comprises at least one message queue interface channel launched by the queue managers to provide a communication path between one application and one queue manager, at least one message channel launched by the queue managers to provide a communication path between two queue managers, and an external monitoring application or a monitoring application within a queue manager. The monitoring application monitors threads, channels, and events in the message queuing system, polls the performance queue periodically and counts the number of threads in the case of the external monitoring application, directly gathers current event information in the case of the monitoring application within the queue manager, determines whether both the thread/threads and channel have failed when all threads of an application are missing, and restarts channels that failed after determining that both channels and all threads have failed.

In an embodiment, a method of managing a message queuing system implemented by a monitoring application executed by a computer is disclosed. The method comprises monitoring channels in the message queuing system, monitoring threads between individual queues in the message queuing system, and counting the numbers of new thread connections, closed threads, and total active threads for any given queue. The method further comprises restarting channels that failed after determining that both channels and all threads have failed, based on thread counts, identifying and restarting missing threads when the number of threads is below a predefined low threshold, recording the number of total restart times, and if the number of restart times exceeds a predefined number in a predefined time period, throwing an error indicating the application is problematic that is associated with the thread.

In an embodiment, a method of monitoring events in a message queuing system implemented by a computer is disclosed. The method comprises monitoring channels and threads in the message queuing system, sending a count of an event to be summed when a new thread connection is established or a thread connection is closed for any given queue, and maintaining a sum with which the count of the number of active threads is kept for any given queue. The method further comprises restarting a queue when a message in a queue has exceeded the maximum number of delivery attempts to the receiving party, and restarting channels that failed after determining that both channels and all threads have failed.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
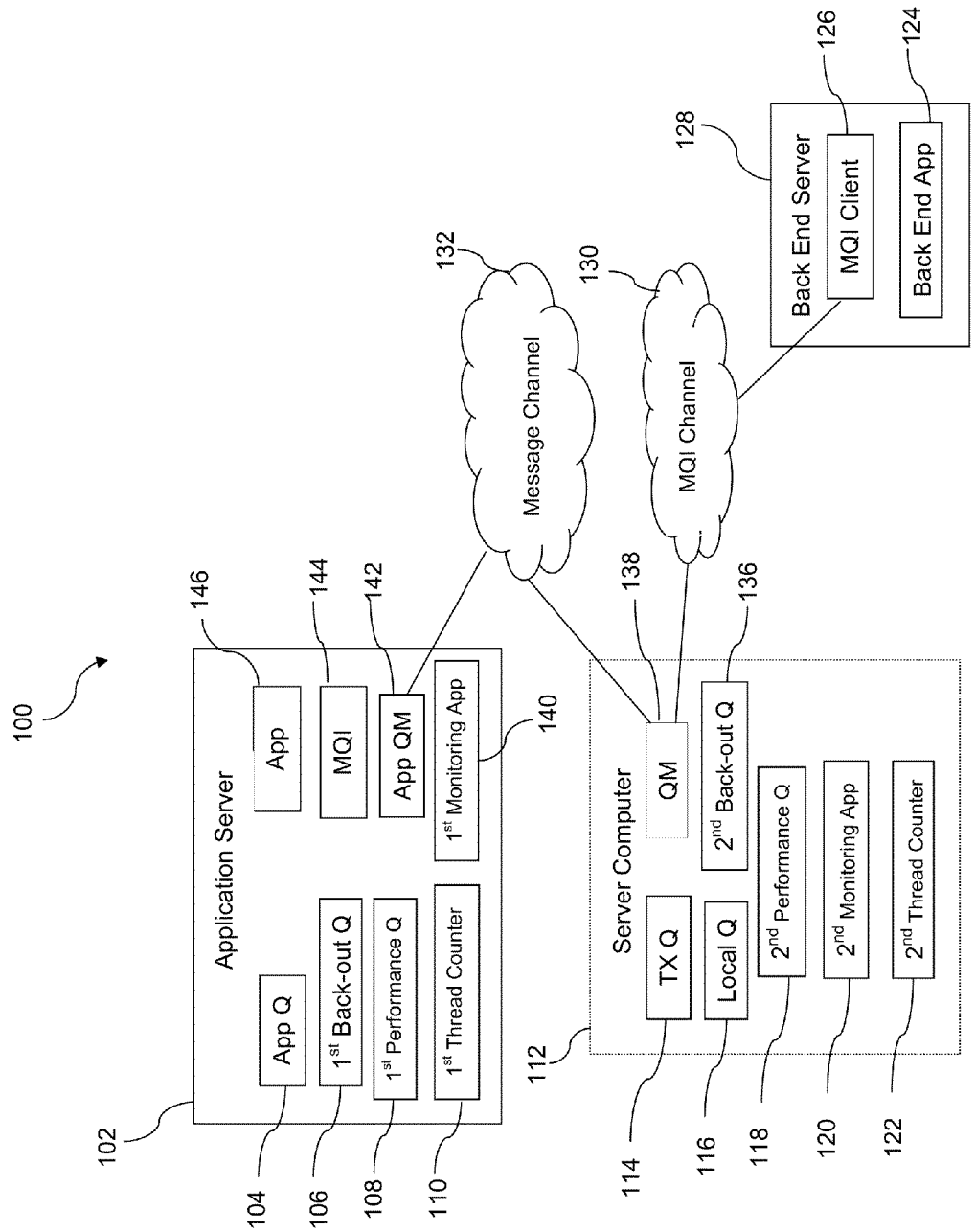
FIG. 1 is an illustration of a message queuing system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by periodic disconnection of applications from a queue in a message queuing system which causes messages in the queue not to be processed. The problems may result from bad messages in the queue associated with the application. For example, messages that entail many failed delivery attempts may cause the entire queue to collapse. In some contexts, a message that experiences a plurality of failed delivery attempts may be referred to as a poison message. The application(s) associated with the queue may also be caused to fail by the poison message, for example because of one or more queue collapses caused by the poison message. The present disclosure teaches a system and method for proactively monitoring queue object, channel object, or another messaging queue middleware object behavior and restoring communication services under predefined circumstances.

For example, a monitoring application may monitor the status of different variables and events in the message queuing system, for example the status of events and the number of channels, new thread connections, closed threads, and total active threads, maintain the counts of active threads, and use the event information including the number of thread counts to detect when threads are missing (crashed or disconnected) that are associated with a queue or an application with unprocessed messages. Threads are fairly good indicators of problems that would affect the health of a queue, and so it makes sense to count the number of threads associated with a queue or an application. One specific channel may have all connections between two certain queues, so it is reasonable to monitor both channels and threads. Events typically provide information about errors, warnings, and other significant occurrence in a queue manager or a message queuing system.

For example, if three applications are connected to a queue, each with three threads inputting into the queue and three threads writing from the queue, the total number of active threads is eighteen. When the number of active threads falls from eighteen to twelve, the monitoring application may trigger an alert and take proactive action. When abnormal behavior is detected, the monitoring application can take a variety of proactive steps to respond to abnormal behavior.

For example, the monitoring application may identify the missing threads and try to restart the missing threads when the total number of active threads is detected to be below a predefined number. The total number of attempts to restart the missing threads may be recorded. When the total number of attempts to restart the missing threads exceeds a predefined threshold, the monitoring application may flag an error indicating that the application is problematic that is associated with the missing threads. The monitoring application may restart a message queue interface channel after determining that both the message queue interface channel that provides a two-way communication path between a message queue interface client and a queue manager on different systems/computers and all threads that are associated with a single application have failed. Additionally, the monitoring application may restart a queue when certain messages are detected at the queue. When the message that causes problems is the type of message whose number of delivery attempts has exceeded a predefined limit, which may cause the queue and even the application associated with the queue to collapse, the message may be moved to a specific type of queue.

Turning now to FIG. 1, a message queuing system 100 is described. In an embodiment, the system 100 comprises an application server 102, a server computer 112, and a back end server 128. The application server 102 may comprise a sender application 146, a message queue interface (MQI) 144, an application queue manager (QM) 142, a first monitoring application 140, a first thread counter 110, a first performance queue 108, a first back-out queue 106, and an application queue 104. The sender application 146 may send messages through the MQI 144, an application queue manager 142, and a message channel 132 to a queue manager (QM) 138 on the server computer 112. The message channel 132 may comprise any combination of private and public networks and may employ any communication protocol such as example transmission control protocol and internet protocol (TCP/IP).

The queue manager 138 may store the messages into a transmission queue (TX Q) 114. The queue manager 138 may be for example, IBM, WebSphere MQ queue manager, Java Message Service (JMS) queue manager, Amazon simple queue service queue manager, or another queue manager. The transmission queue 114 may be located in the same computer, in this case the server computer 112, as the queue manager 138. The server computer 112 may comprise the transmission queue 114, a local queue 116, a second performance queue 118, a second monitoring application 120, a second thread counter 122, a second back-out queue 136, and the queue manager 138. When the messages from the sender application 146 are directed to the receiver application, a back end application 124, the messages stored on the server computer 112 may be retrieved by the back end application 124 through the message queue interface client 126 on the back end server 128. The back end server 128 may comprise the message queue interface client 126 and the back end application 124. A message queue interface (MQI) channel 130 may provide a two-way communication path between a message queue interface client 126 and a queue manager 138 on different systems/computers, for example an MQI channel 130 between the message queue interface client 126 on the back end server 128 and the queue manager 138 on the server computer 112. In an embodiment, the message channel 132 and the MQI channel 130 are the two categories of channels in a typical message queuing system.

It is understood that the message queuing system 100 may comprise any number of the application server 102, any number of the server computer 112, and any number of the back end server 128. The application server 102 and the server computer 112 may be two different computers or one and the same computer. The application server 102 and the back end server 128 may be two different computers or one and the same computer. Furthermore, the application server 102, the server computer 112, and the back end server 128 may be different computers or one and the same computer. In the case where the application server 102, the server computer 112, and the back end server 128 are one and the same computer, the sender application 146 and the back end application 124 are two applications within the same computer that communicate with each other through the message queuing system 100. The sender application 146 may be any application that may desire to communicate with another application, the back end application 124. For example, the sender application 146 may be a web server application and the back end application 124 may be a web browser application.

In an embodiment, a queue may be a data structure that stores messages until the messages are retrieved by the applications that service the queue. Messages stored in the queue may accumulate on the queue until the messages are retrieved. Messages may encapsulate service requests or service responses. The sender application 146 may send messages that may encapsulate service requests to the application queue 104 to be sent to the receiver application, the back end application 124. The sender application 146 may access the application queue 104 by using the message queue interface 144. One application may send messages to the application queue 104. Alternatively, multiple applications may send messages to the same queue, the application queue 104. In an embodiment, the application queue 104 belongs to the application queue manager 142. The application queue manager 142 may organize the messages and place them in the appropriate queue. The application queue 104 may be physically managed by the application queue manager 142 and this process may not be apparent to the sender application 146.

The messages stored in the application queue 104 intended for the back end application 124 may be managed by the application queue manager 142 and the application queue manager 142 may decide where the messages will be initially sent. For example, the application queue manager 142 sends a first message from the application queue 104 for the sender application 146 to the transmission queue 114. The queue manager 138 may evaluate messages received on the transmission queue 114, and determines whether each message can be serviced locally by the local queue 116, or needs to be forwarded to another queue. In this example, the queue manager 138 takes the first message from the transmission queue 114 and puts the first message on the local queue 116, which makes the message available to the back end application 124 through the MQI client 126. Subsequently, the back end application 124 may check the local queue 116 for messages that can be serviced locally, and provide the data requested by the message. After the back end application 124 provides the data requested by the message, the queue manager 138 may transfer the message that may encapsulate service responses from the local queue 116 back to the transmission queue 114. The transmission queue 114 may return the message with the requested data back to the application queue 104 for the sender application 146.

In another example, the application queue manager 142 may send a second message from the application queue 104 for a second application to the transmission queue 114. If the queue manager 138 determines that the message cannot be serviced locally by the local queue 116, which may happen with this example, the queue manager 138 may forward the message in the transmission queue 114 to another queue. The queue manager 138 may forward the message to a transmission queue 114 associated with a local queue 116 that directly services the message or to a transmission queue 114 that forwards the message on to yet another transmission queue. The local queue that directly services the message may be referred to the destination queue for the message.

The message channel 132 may be a one-way communication path between two queue managers, the application queue manager 142 and the queue manager 138. If two-way communication between the two queue managers 142 and 138 is needed, two message channels 132 may be implemented. The message channels 132 may be logical addresses in the message queuing system. It may depend on the message queuing system product and the implementation of the message queuing system product how the message channels 132 are implemented. A variety of existing communications protocols, for example TCP/IP, may be integrated into the message channel 132. Alternatively, other communications protocols may be specifically developed and provided by the message queuing system venders to be integrated into the message channel 132. Different channels 132 may be utilized by the messaging middleware for different types of information that the sender application 146 intends to communicate. For example, when the application 146 sends information, the sender application 146 may not randomly add the information to any message channel 132 available. Alternatively, the sender application 146 may add the information to the message channel 132 whose specific purpose is to serve that kind of information. Likewise, the back end application 124 that intends to receive information may not randomly fetch information from a random message channel 132. Instead, the back end application 124 may fetch information from some specific type of channel. The selection of the specific type of channel may be done based on the type of information the back end application 124 intends to receive.

The MQI channel 130 may be established by a command an administrator issues from the MQI client application 126. The MQI channel 130 may be a two-way link used for the transfer of MQI calls and responses only. The MQI calls and responses the MQI channel 130 may handle comprise the MQI calls that comprise message data and MQI calls that result in the return of message data. One specific channel may have all connections between two certain queues, so it is reasonable to monitor both channels and threads instead of just threads.

In most cases the sender application 146 and the application queue manager 142 may not be able to directly communicate to each other without some kind of common application programming interface such as the MQI 144. The MQI 144 may provide a common interface between the sender application 146 and the application queue manager 142. In an embodiment, the MQI 144 is the common application programming interface (API) for the messaging middleware. The messaging middleware may offer four major interoperable APIs, for example message queue interface (MQI), Java message service (JMS), application messaging interface (AMI), common messaging interface (CMI), or another API. The MQI 144 may connect to multiple queue managers on different systems. Alternative message channels 132 using different communications protocols may be utilized with the MQI 144. The MQI 144 may connect, open, or attach to the message queuing system 100. Alternatively, the MQI may close or detach from the message queuing system 100. The sender application 146 may send messages to or receive messages from the back end application 124, or another application that the sender application 146 may communicate with, through the MQI 144. For example, the MQI 144 may send a message to the application queue 104 and send a message to or receive a message from the local queue 116.

The application queue manager 142 may provide messaging services to the sender application 146. The queue manager 138 may provide messaging services to the back end application 124. In an embodiment, the queue manager 138 is the main component in a message queuing system. The queue manager 138 may provide an application programming interface, in this case the MQI client 126, so that the back end application 124 can put messages on, and get messages from, the local queue 116. In an embodiment, for the application 124 to use the queue manager 138, the back end application 124 may establish a connection to the queue manager 138, the MQI channel 130. Queue managers may be able to communicate to other queue managers for one application to send messages to another application that is connected to another queue manager. For example, the queue manager 138 may be able to communication to the application queue manager 142 so that the back end application 124 that is connected to the queue manager 138 may be able to send messages to the sender application 146 that is connected to the application queue manager 142. For example, the message queuing middleware from IBM, WebSphere MQ, implements a store-and-forward protocol to ensure the safe delivery of messages between applications that are connected to different queue managers. The queue manager 138 may send messages to the correct local queue 116 or route messages to another queue manager. The queue manager 138 may process the MQI client 126 calls issued to the queue manager 138 and commands submitted to the queue manager 138 from any source. In addition, the queue manager 138 may launch and host the other objects in the message queuing system 100, for example the queue 114, 116, 118, 136, the message channel 132, or another object in the message queuing system 100. For example, the queue manager 138 may start channels 130 and 132 and create, delete, and alter the queues 114, 116, 118, 136 and the channel 130 and 132 definitions.

The first thread counter 110 may be hosted by the application queue manager 142 or the first monitoring application 140. The second thread counter 122 may be hosted by the queue manager 138 or by the second monitoring application 120. In an embodiment, threads, or processing threads, are sequences of programmed instructions launched by the queue managers 138 and 142 to transmit and receive messages between the queues over connections within channels. In an embodiment, threads are fairly good indicators of problems that would affect the health of a queue, rather than problems that would just affect the load on the queue. Hence, it makes sense to count the number of threads associated with a queue or an application. The thread counters 110 and 122 may be utilized to count the number of threads for any given queue 116 or 104 or any given application 124 or 146.

The performance queues 108 and 118 may be exploited to store event status information related to performance of the queues 116, 114, and 104 including results from the thread counters 110 and 122. Events typically provide information about errors, warnings, and other significant occurrences in a queue manager or a message queuing system 100. For example, when a thread begins the process of reading from or writing to the local queue 116, an event may be triggered. When a monitoring application gathers current event information from the queue manager 138, an event may be triggered. Additionally, in the case where the second monitoring application 120 is an external monitoring application instead of a component within the queue manager 138, when the external monitoring application 120 polls the status of the queues 116, 114, and 136 and counts the numbers of threads in each state, an event may be triggered. The performance queues 108 and 118 may also store information from the thread counters 110 and 122. The monitoring application 140 or 120 may periodically poll the performance queue 108 or 118 and count the number of threads. Additionally, the monitoring application 140 or 120 may check other statistics stored in the performance queue 108 or 118. For example, the monitoring application 140 or 120 may parse the event types of the non-performance queues 116, 114, and 104 stored in the performance queue 108 or 118 and gains the event status of the non-performance queues 116, 114, and 104. The performance queue 108 or 118 may handle the calculation for net numbers of threads and keep statistics on the way. The messaging middleware, the queue manager in this case, may be able to do the calculation and fire events as long as the middleware established and maintains connections to the queue.

In an embodiment, the monitoring application 140 or 120 tracks different variables and events to reduce the risk that the applications 146 and 124 may not be able to accomplish intended communication. The second monitoring application 120 may be an application within the queue manager 138 or an external application outside of the queue manager 138. The monitoring application 120 may monitor threads, channels, and events in the message queuing system 100. For example, when the second monitoring application 120 is an external monitoring application, the second monitoring application 120 may periodically poll the second performance queue 118. Alternatively, when the second monitoring application 120 is a monitoring application within the queue manager 138, the second monitoring application 120 may directly gather current event information. A particular application may have only one type of connection. The second monitoring application 120 may parse the event types and the application types of a connection.

For example, the monitoring applications 140 and 120 may monitor the behavior of the queues 116, 114, and 104. The monitoring applications 140 and 120 may monitor the behavior of the channels 132 and 130. The monitoring applications 140 and 120 may take action when certain activities/behaviors of the queues 116, 114, and 104 and channels 132 and 130 are detected. For example, the monitoring application 140 or 120 may trigger certain events based upon the number of the threads. For example, the second monitoring application 120 may restart one or more of the queues 116 and 114 based upon the number of threads associated with the queues 116 and 114. The second monitoring application 120 may be able to restart one or more of the threads. The second monitoring application 120 may be able to restart one or more of the channels 132 and 130. In addition, the second monitoring application 120 may throw errors under certain circumstances, for example when an back end application 124 tries to open a thread over a predefined number of times.

The second monitoring application 120 may function in a synchronous way (polling) or an asynchronous way (watching). When the second monitoring application 120 works in the synchronous way by polling, a call may be made to the second performance queue 118 to collect the specified information and the function does not return until the operation is complete. Alternatively, when the second monitoring application 120 works in the asynchronous way by watching, a call may be made to the API/MQI client 126 to register interest in specified variables or events. The function may return immediately. Whenever the specified event happens, a monitoring message may be sent asynchronously to the second monitoring application 120. Typically, the second monitoring application 120 may use callbacks to process the information. Both polling and watching may be used within the same second monitoring application 120.

In an embodiment, the monitoring application 120 or 140 monitors the number of threads for any given queue. For example, the monitoring application 120 or 140 may monitor new connections to a queue. When a new thread connection is established, the monitoring application 120 or 140 may send a count of a new thread connection to be summed by the thread counter 122 or 110 for the queue of the new connection. The monitoring application 120 or 140 may monitor closed connections of a queue. For example, when a thread connection is closed or fails the heartbeat mechanism and is presumed dead, the monitoring application 120 or 140 may send a count of the thread connection to be deducted by the thread counter 122 or 110 for the queue associated with the closed connection. In addition, the total number of active threads for any given queue is maintained by the thread counter and the monitoring application 120 or 140 may access the thread counter to gain the total number of active threads. The total number of threads for a single queue comprises both threads that are in the process of reading from the queue and threads that are in the process of writing to the queue.

A normal number or a range of normal number of threads associated with a single application 124 or 146 may be determined. For example, the monitoring application 120 or 140 may abstract connection lists for each queue, identify the threads by applications. The monitoring application 120 or 140 may identify the threads as which ones are open-exclusive, open-shared, and so on. A single application may connect to a single queue while more than one application may connect to a queue. For example, a minimum of two threads per queue for an application is typical for production purposes, and usually more than two threads per queue are observed. For example, router applications typically have three threads per queue. For some applications up to forty instances of threads per queue may be observed. The range of normal number of threads of a specific application may be determined based on different time or date. For example, the range of normal number of threads of the sender application 146 may be determined based on different time period of the day, the week, the month, the year, or some other time interval. The range of normal number of threads of the sender application 146 may be determined based on some date of the week, the month, the year, or some other date. The range of normal number of threads of the sender application 146 may be determined based on different time intervals, for example every minute, every hour, every five hours, or some other time interval.

When the number of threads falls outside the range of the normal number, an event may be triggered. For example, if the normal number of threads connected to a queue is five at that moment, if it goes up to ten or goes down to one, an event/alarm may be triggered. When the number of threads falls outside a range with a deviation from the range of the normal number of threads, an alarm may be triggered. For example, if in the last week (seven days), a range of five to eight active threads was detected for the sender application 146, then the range of five to eight active threads may be determined as the range of the normal number of threads for the sender application 146. When a deviation of ½ is used to determine when the number of total active threads falls outside the range of the normal number of the threads, if less than two threads or more than twelve threads are detected, an event/alarm may be triggered. The message queuing system may be more alerted when the sender application 146 loses all the connections to the application queue 104.

When the total number of threads falls below a predefined low threshold, for example the lower bound of the range with a deviation from the range of the normal number of threads, the second monitoring application 120 may try to identify the missing threads after an alert is generated. The second monitoring application 120 may further restart threads that are identified as missing threads. The total number of attempts to restart a missing thread may be recorded and updated in a timely manner. A count of the number of attempts to restart the missing thread may be maintained. In an embodiment, the count of restart attempts may be maintained in such a way that old counts are removed from the count. Alternatively, a plurality of counts for a subject thread that correspond to different time intervals may be maintained. When the total number of attempts to restart a missing thread exceeds a predefined number during a predefined time period, the second monitoring application 120 may throw an error indicating the back end application 124 is problematic that is associated with the thread and take action. For example, if the second monitoring application 120 has tried twenty times, which is a predefined limit for restart attempts, to restart a missing thread during an hour, which is a predefined time period, the second monitoring application 120 may throw an error message and reboot the back end application 124, or even begin start-up steps. When the total number of threads exceeds a predefined high threshold, the second monitoring application 120 may also try to find out the reason.

The range of normal numbers of inputting threads to a local queue 116 and the range of normal numbers of outputting threads from the local queue 116 associated with the back end application 124 may be determined. Furthermore, the range with a predefined deviation from the range of the normal numbers of inputting and outputting threads associated with the back end application 124 may also be determined. Thus, the high and low threshold of the range of the number of inputting and outputting threads of the local queue 116 associated with the back end application 124 may be determined. The high and low thresholds may be set manually by a system administrator or may be adjusted automatically by the second monitoring application 120 in a self-healing manner.

When all threads of the back end application 124 connected to the local queue 116 are determined to be missing, the second monitoring application 120 may check the status of the MQI channel 130 and determine whether the MQI channel 130 has failed. The second monitoring application 120 may restart the MQI channel 130 after determining that both the threads and the MQI channel 130 have failed. Particular threads may also check the status of the MQI channel 130 and restart the MQI channel 130 when both the MQI channel 130 and all threads of the back end application 124 are determined to have failed. When no queue depth, which is the number of messages on the local queue 116, and lost threads are detected, no alarm should be generated. When no queue depth or no active thread is detected, no alarm should be generated. The second thread counter 122 may be set not to monitor the thread anymore, or at least for a predefined period.

The second monitoring application 120 may take action when certain messages are detected at a queue, for example when a message is detected at a queue that has exceeded the predefined limit (maximum number) of delivery attempts for a single message to the receiving party. This kind of message is typically called a poison message. In an embodiment, the process of identifying the poison message is triggered based on thread counts instead of the traditional time-out method. The poison message may cause the local queue 116 that the poison message is associated with to collapse, the connection from the back end application 124 to the local queue 116 to fail, and even the back end application 124 to fail resulting in the failure in delivery for other messages in the local queue 116. The second monitoring application 120 may check whether it is configured for the second monitoring application 120 to move the last message, which has exceeded the predefined maximum number of delivery attempts, to the second back-out queue 136. If this function is configured, the second monitoring application 120 may simply move the message to the second back-out queue 136. If this function is not configured, the second monitoring application 120 may add that function and move the message to the second back-out queue 136. Thus the predefined limit time of delivery attempts for a message may be called a back-out count threshold. When the local queue 116 dies and the threads fail but none of the messages in the queue has exceeded the limit of the delivery attempts, the second monitoring application 120 may not move any message to the second back-out queue 136 because the back-out count threshold was not hit. By restarting the local queue 116 the second monitoring application 120 may assure the delivery of other messages in the local queue 116.

In an embodiment, the back end application 124 may restart the threads when the poison message is moved to the second back-out queue 136. The restarting process may happen instantaneously when the back end application 124 makes a new request/response. Please note that the back end applications 124 that reconnect in existing message queuing systems are the applications that are writing a lot at the moment. In a current typical message queuing system, server applications may not be able to restart the threads at this type of problem or even discover this type of problem because the server applications may only be waiting for one message in the queue and the server applications may put an infinite weight on the queue.

Figure 2:
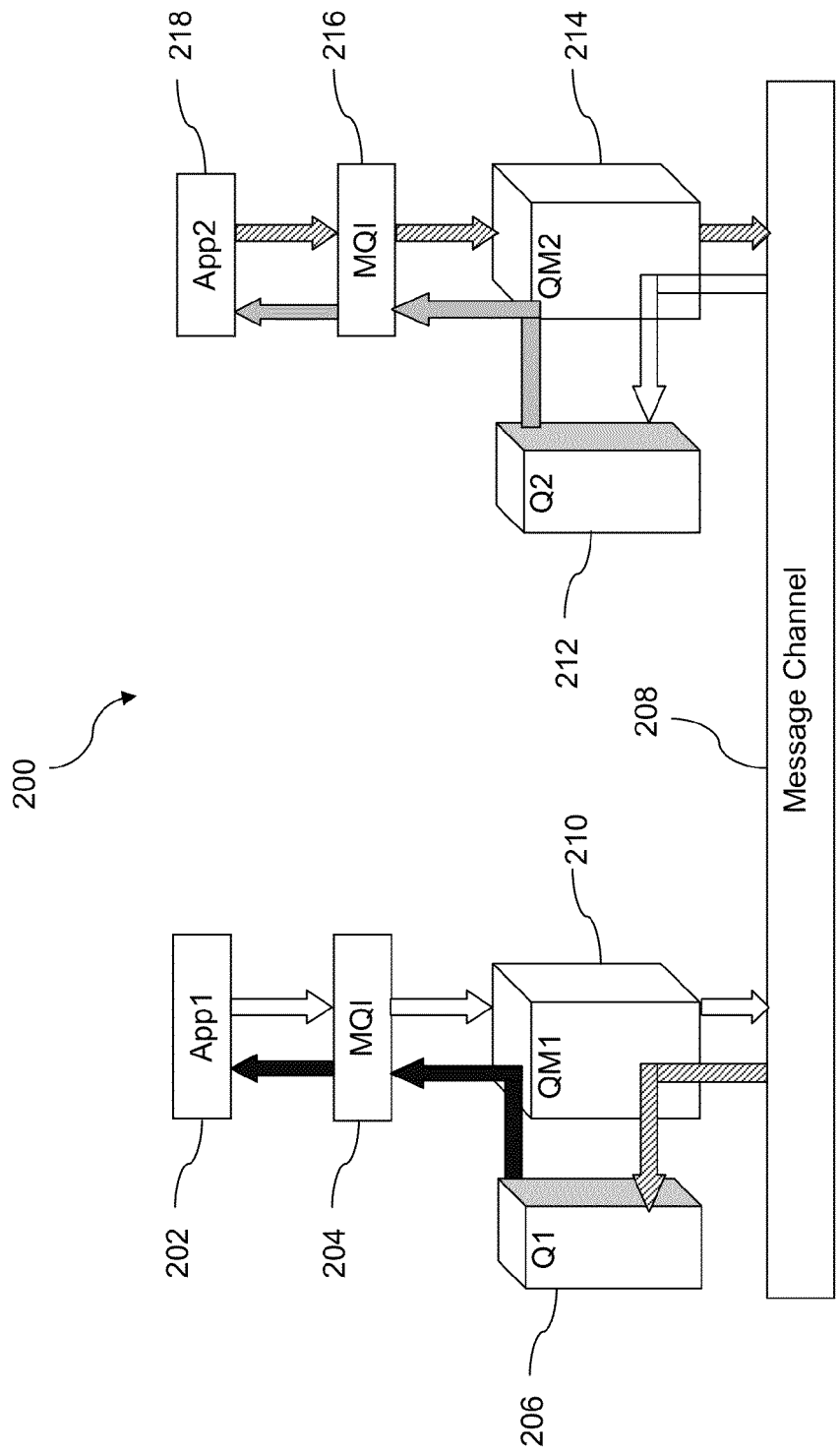
FIG. 2 is an illustration of a message flow of a message queuing system according to an embodiment of the disclosure.

Turning now to FIG. 2, a message queuing system 200 is described. In an embodiment, the message queuing system 200 comprises two applications 202 and 218, two MQIs 204 and 216, at least two queues 206 and 212, two queue managers 210 and 214, and a message channel 208. The message queuing system 200 is symmetric in FIG. 2, but in another embodiment the message queuing system 200 may not be symmetric. The message flows shown in the message queuing system 200 are symmetric showing messages transmitted from the two applications 202 and 218, but only one message flow will be discussed. In an embodiment, one of the two message flows starts at the application 202, from which the message is sent. The sender application 202 sends a message via the MQI 204, the queue manager 210, and the message channel 208 to the queue 212 at the receiver application 218 side. The queue 212 may be a local queue to the queue manager 214 while the queue 212 may be a remote queue to the queue manager 210. The queue manager 210 may have set up the queue 212 so that the queue manager 210 can locate the queue manager 214 associated with the receiver application 218. The messages sent by the application 202 may accumulate in the queue 212 until the receiver application 218 retrieves them. In an embodiment, the receiver application 218 then retrieves the message stored in the queue 212 via the queue manager 214 and the MQI 216.

Figure 3:
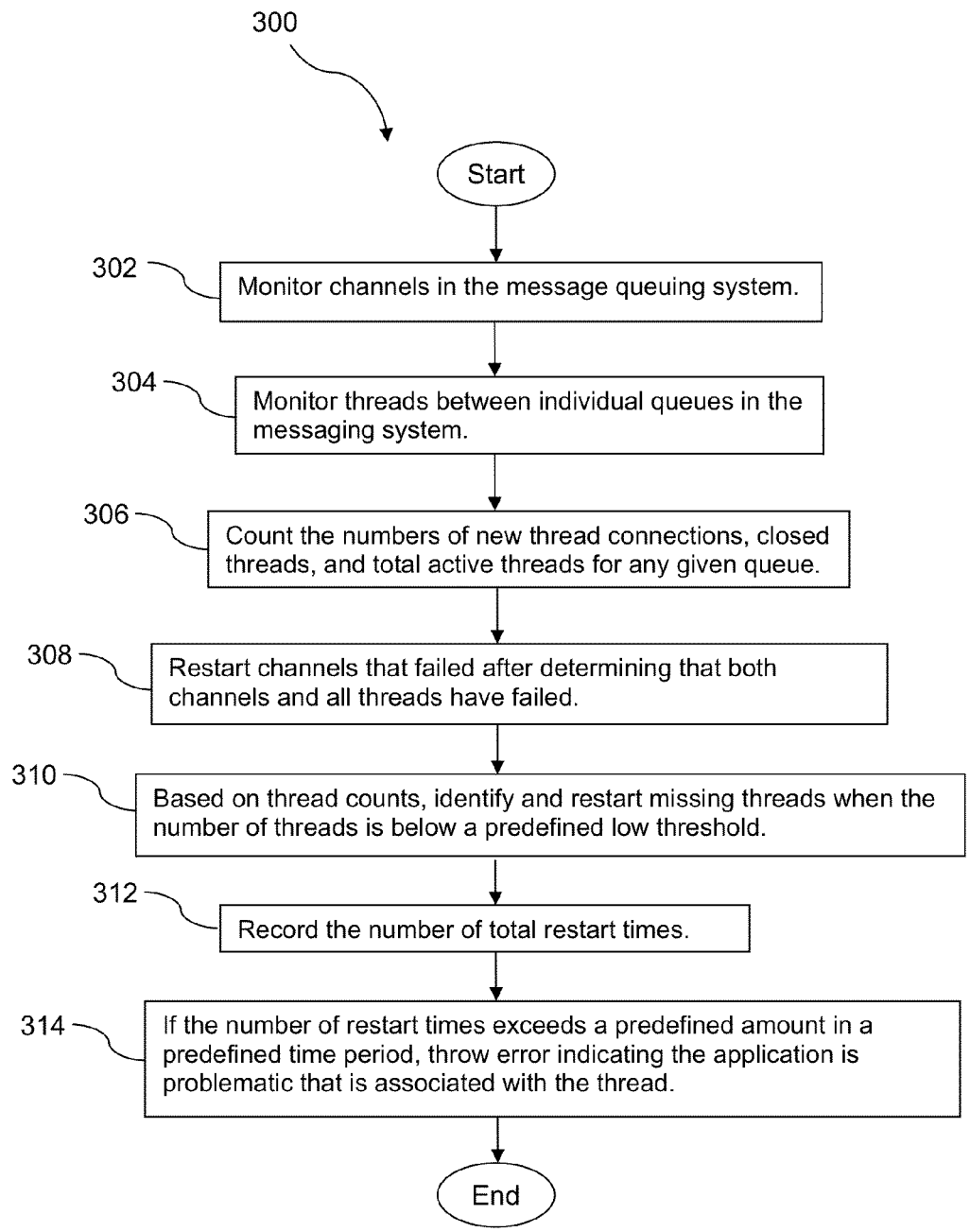
FIG. 3 is a flow chart illustrating a method according to an embodiment of the disclosure.

Turning now to FIG. 3, a method 300 is described. At block 302, channels in the message queuing system are monitored by a monitoring application in the message queuing system. The monitoring application may be within a queue manager or an external monitoring application outside of the queue manager. At block 304, threads between individual queues in the message queuing system are monitored. Threads may be processing threads that operate within channels to connect individual queues. At block 306, the numbers of new thread connections, closed threads, and total active threads for any given queue are counted. The thread counter maintains the total number of active threads. The monitoring application sends a notification to the thread counter when a new thread connection or a closed thread connection occurs. At block 308, channels that failed are restarted after it is determined that both the channel and all threads of the application in that channel have failed. At block 310, based on thread counts, missing threads are identified and restarted when the number of threads is below a predefined low threshold. At block 312, the number of total restart times of threads is recorded. A count of the number of attempts to restart the missing threads may be maintained. In an embodiment, the count of restart attempts may be maintained in such a way that old counts are removed from the count. Alternatively, a plurality of counts for thread restarts that correspond to different time intervals may be maintained. At block 314, if the number of restart times exceeds a predefined number in a predefined time period, an error is thrown indicating the application is problematic that is associated with the thread.

Figure 4:
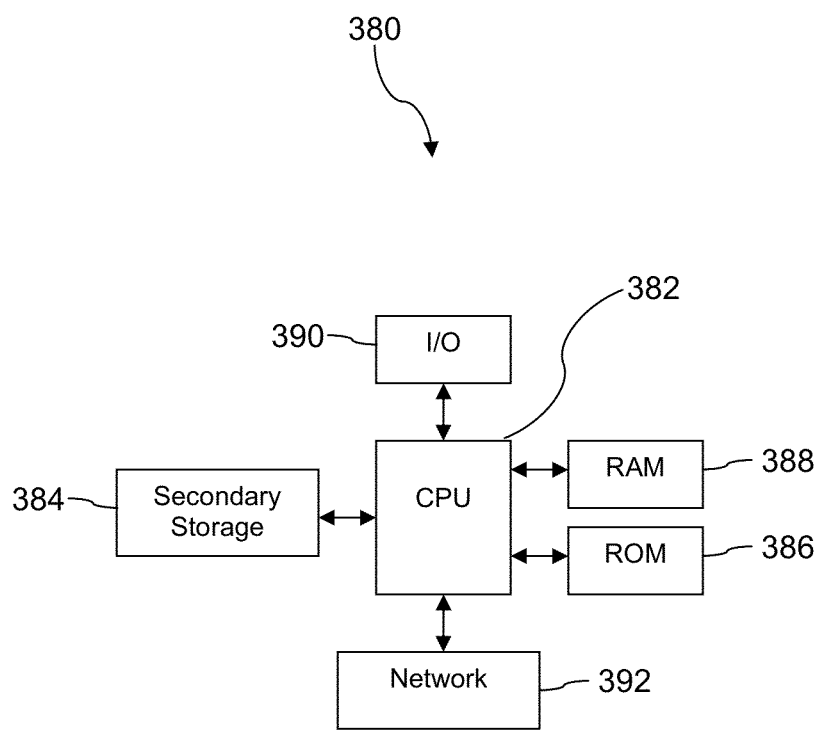
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A message queuing system implemented by at least one server computer, comprising:

at least two thread counters;

at least two receiving queues that each receive messages;

a performance queue that maintains event status associated with performance of non-performance queues;

at least two queue managers;

a plurality of threads, which are sequences of programmed instructions, that are each launched by one of the at least two queue managers, wherein each of the plurality of threads transmits or receives messages over connections between individual queues;

at least one message queue interface channel launched by one of the at least two queue managers that provides a communication path between one application and one of the at least two queue managers;

at least one message channel launched by one of the at least two queue managers that provides another communication path between the at least two queue managers, wherein the at least one message channel is independent from the at least one message queue interface channel; and a monitoring application associated with one of the at least two queue managers, which configures at least one processor of the at least one server computer, to:

monitor threads, channels, and events in the message queuing system, wherein the monitoring application monitors the threads by counting a total number of threads using the thread counters, and wherein the total number of threads in the thread counters comprises both threads that are in the process of reading from a queue and threads that are in the process of writing to the queue, poll the performance queue at a periodic interval responsive to the monitoring application being an external monitoring application, directly gather current event information responsive to the monitoring application being within one of the at least two queue managers, determine whether all threads associated with an application are missing, wherein the determining is based on the monitoring application accessing the thread counters, responsive to determining that all threads associated with the application are missing, for each of the missing threads associated with the monitoring application, determine whether the corresponding thread and channel have failed, and restart channels that failed after determining that both channels and all threads have failed.

2. The message queuing system of claim 1, wherein the counting comprises a sum of the total number of active threads of any given queue that includes threads during an input process of reading and threads during an output process of writing.

3. The message queuing system of claim 1, wherein the monitoring application polls the performance queue by periodically checking statistics associated with the performance queue.

4. The message queuing system of claim 3, wherein the monitoring application parses event types and gains the event status of the non-performance queues.

5. The message queuing system of claim 1, wherein the monitoring application restarts a queue responsive to a message in the queue exceeding a maximum number of delivery attempts.

6. The message queuing system of claim 1, wherein a particular thread of the plurality of threads checks a status of an associated channel and connection status of at least one other thread.

7. The message queuing system of claim 1, wherein the number of threads associated with a single queue is checked.

8. A method of managing a message queuing system implemented by a monitoring application that configures at least one processor executed by a server computer, comprising:

monitoring, by the monitoring application, channels in the message queuing system;

monitoring, by the monitoring application, threads between individual queues in the message queuing system by counting a total number of threads using thread counters, wherein the total number of threads in the thread counters comprises both threads that are in the process of reading from the individual queues and threads that are in the process of writing to the individual queues;

counting, by the monitoring application, the number of new thread connections, closed threads, and total active threads for any given queue in the message queuing system;

determining, by the monitoring application, whether all threads associated with an application are missing, wherein the determining is based on the monitoring application accessing the thread counters;

responsive to determining that all threads associated with the application are missing, for each of the missing threads associated with the monitoring application, determining, by the monitoring application, whether the corresponding thread and channel have failed;

restarting, by the monitoring application, channels that failed after determining that both channels and all associated threads have failed;

based on thread counts, identifying and restarting missing threads, by the monitoring application, responsive to the number of threads being below a predefined low threshold;

recording, by the monitoring application, the number of total restart times associated with any of restarting the channels or restarting the missing threads; and responsive to a determination that the number of total restart times exceeds a predefined number during a predefined time period, throwing, by the monitoring application, an error that indicates that an application associated with at least one of the missing threads is problematic.

9. The method of claim 8, wherein the monitoring threads between individual queues comprises polling a queue stack of the corresponding queue at a periodic interval and counting the number of threads.

10. The method of claim 9, further comprising triggering, by the monitoring application, events based upon the counted number of threads.

11. The method of claim 8, further comprising triggering, by the monitoring application, an event responsive to a thread beginning a process of reading from one of the individual queues.

12. The method of claim 8, further comprising triggering, by the monitoring application, an event responsive to a thread beginning a process of writing to one of the individual queues.

13. The method of claim 8, further comprising triggering, by the monitoring application, an event responsive to a monitoring application gathering current event information.

14. The method of claim 8, further comprising triggering, by the monitoring application, an event responsive to an external monitoring application polling the status of queues and counting the number of threads in each state of the polled queues.

15. The method of claim 8, further comprising, identifying, by the monitoring application, a message in a queue that has exceeded a maximum number of delivery attempts, wherein the identifying is based on the thread counts.

16. A method of monitoring events in a message queuing system implemented by a monitoring application that configures at least one processor of a computer, comprising:

monitoring, by the monitoring application, channels and threads in the message queuing system;

sending, by the monitoring application, a count of an event to be summed when a new thread connection is established or a thread connection is closed for any given queue;

monitoring, by the monitoring application, threads between individual queues in the message queuing system by counting a total number of threads using thread counters, wherein the total number of threads in the thread counters comprises both threads that are in the process of reading from queues and threads that are in the process of writing to the queues;

maintaining, by the monitoring application, a sum of thread counts of any given queue corresponding with the number of active threads;

identifying a message in a queue that has exceeded a maximum number of delivery attempts, wherein the process of identifying the message in the queue that has exceeded the maximum number of delivery attempts is based on thread counts;

restarting, by the monitoring application, the queue when the message in the queue has exceeded the maximum number of delivery attempts to a receiving party of the message;

determining, by the monitoring application, whether all threads associated with an application are missing, wherein the determining is based on the monitoring application accessing the thread counters;

responsive to determining that all threads associated with the application are missing, for each of the missing threads associated with the monitoring application, determining, by the monitoring application, whether the corresponding thread and channel have failed; and restarting channels that failed after determining that both channels and all threads have failed.

17. The method of claim 16, further comprising:

calculating, by at least one of the monitoring application or messaging middleware, the number of threads connected to a single queue; and triggering, by at least one of the monitoring application or messaging middleware, events as long as the messaging middleware has established and maintains connections to the queue.

18. The method of claim 16, further comprising:

responsive to an application program attempting to open a thread over a predefined number of times, flagging, by the monitoring application, an error; and taking, by the monitoring application, further action based on the flagged error.

19. The method of claim 16, wherein a range of normal number of threads associated with a specific application is determined and detected responsive to identifying an application that loses all connections to a queue.

20. The method of claim 16, wherein the message that has exceeded the maximum number of delivery attempts is moved to a back-out queue responsive to the message being properly configured.

* * * * *